June 17, 1969

W. B. BANKS 3,449,940

APPARATUS FOR MEASURING PHYSICAL PROPERTIES OF MATERIALS

Filed July 22, 1966

$W_T = W_2 + W_3$

William B. Banks
INVENTOR.

BY James T. Weiler
Jefferson D. Gilley
William A. Stout
Paul A. DeVeste II
Dudley R. Dobie Jr.
ATTORNEYS

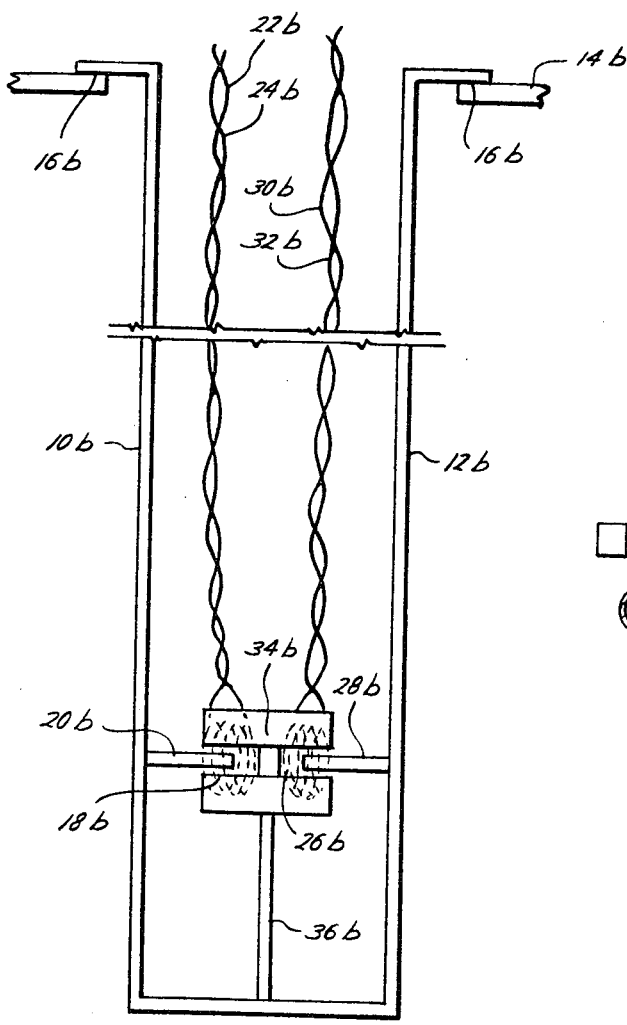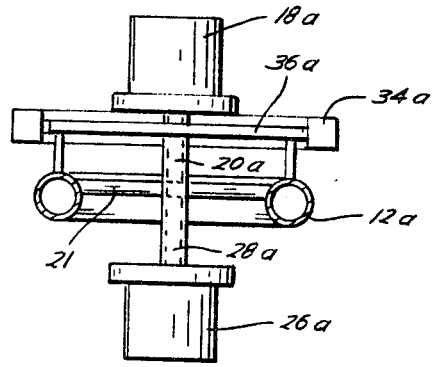

United States Patent Office 3,449,940
Patented June 17, 1969

3,449,940
APPARATUS FOR MEASURING PHYSICAL
PROPERTIES OF MATERIALS
William B. Banks, Houston, Tex., assignor to Automation Products, Inc., Houston, Tex., a corporation of Texas
Filed July 22, 1966, Ser. No. 567,217
Int. Cl. G01n 9/00
U.S. Cl. 73—32                                14 Claims

ABSTRACT OF THE DISCLOSURE

A vibratory sensing element in which the vibration drive means and the vibration measuring means are mounted on and supported by the sensing element thereby limiting the effects of external conditions. Vibration drive means and vibration measuring means are resiliently supported from the sensing element at a position spaced from the support of the sensing element for isolating the input and output signals from the sensing element support, the mass of the sensing element being less than the mass of the vibration drive means and vibration measuring means. The natural resonant frequency of the apparatus about the sensing element supports is substantially lower than the frequency of operation of the vibration drive means and of the natural resonant frequency of the resilient means whereby the apparatus is substantially isolated from external vibration.

---

The present invention relates to an apparatus for measuring physical properties of materials, and more particularly, relates to a vibratory sensing apparatus which is less sensitive to its environmental conditions.

In the past various embodiments of a vibratory apparatus for measuring physical properties of material in which a material sensing element is vibrated and in which the effect of the material on the sensing element affects the vibration of the sensing element to provide a measurement of various physical properties of the material have been proposed such as in my Patent Nos. 3,145,559 and 3,177,705.

It is a general object of the present invention to provide a vibratory sensing element in which the vibration drive means and the vibration measuring means are mounted on and supported by the sensing element thereby limiting the effect of external conditions.

A further object of the present invention is the provision of an apparatus for measuring physical properties of materials in which a material sensing element adapted to contact the material being measured is supported for vibratory movement, and in which vibration drive means and vibration measuring means are resiliently supported from the sensing element and spaced from the sensing element support and in which the signal transmissibility from the sensing support is small whereby the apparatus will not be affected by external conditions.

A still further object of the present invention is the provision of a vibratory apparatus for measuring physical properties of materials in which a material sensing element is adapted to be supported for vibratory movement, and in which the drive means for vibrating the sensing element and the measuring means for measuring the vibration of the sensing element are resiliently supported from the sensing element and have a mass greater than the mass of the sensing element whereby the sensing element will vibrate relative to the drive and measuring means, and the input and output signals are substantially isolated from other frequencies by being spaced from the sensing element support.

Yet a further object of the present invention is the provision of a vibratory apparatus for measuring physical properties of material in which a hollow material sensing element is provided and supported for vibratory movement and in which the first side of the sensing element is adapted to contact the material being measured, and in which drive vibration means and vibration measuring means are supported by resilient means from the sensing element on the side remote from the first side and therefore are positioned out of contact with the material being measured whereby the sensitivity of the apparatus to environmental conditions such as the temperature of the material being measured, and external mounting vibrations have less effect on the apparatus stability.

Yet a still further object of the present invention is the provision of an apparatus for measuring physical properties of material in which a material sensing element is supported for vibratory movement and for contact with the material to be measured wherein the vibration drive means and the vibration measuring means are mounted on and supported from the sensing element by resilient means, and in which the natural resonant frequency of the apparatus about the sensing element support is substantially lower than the frequency of operation of the vibration drive means and of the natural resonant frequency of the resilient means whereby the apparatus is substantially isolated from external effects which will affect its stability.

A still further object of the present invention is the provision of an apparatus for measuring the mass of a flowing material in which a hollow U tube sensing element is provided for conducting the flowing material and the element is supported for vibratory movement about its legs, and in which electromagnetic vibration drive means and electromagnetic vibration measuring means are supported from the U tube resiliently by spring means at a point spaced from the U tube support, and in which the natural resonant frequency of the apparatus about the U tube support is substantially lower than the frequency of the vibration drive means.

Other and further objects, features and advantages will be apparent in the following description of presently preferred embodiments of the invention, given for the purpose of disclosure, and taken in conjunction with the accompanying drawings, where like character references designate like parts throughout the several views and where:

FIGURE 3 is a cross-sectional view taken along the line 3—3 of FIGURE 2, and

FIGURE 4 is a schematic elevational view of another form of the present invention.

Figure 1:
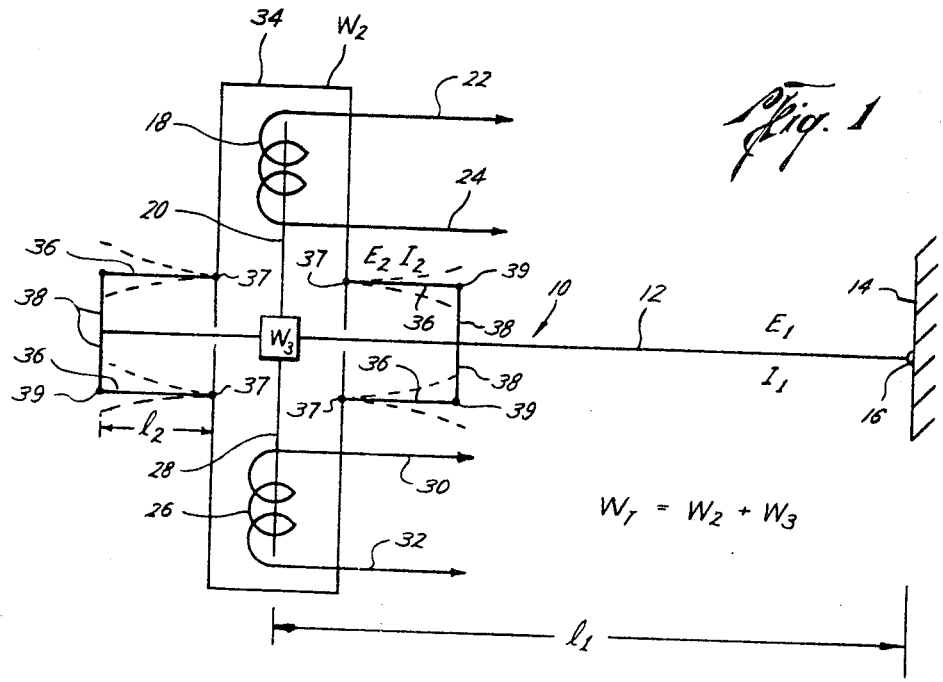
FIGURE 1 is a schematic diagram of the present invention.

Referring now to the drawings, and particularly to FIGURE 1, the numeral 10 generally designates the apparatus of the present invention here shown in schematic form. Apparatus 10 includes a material sensing eelement 12 which is adapted to be supported by a support 14 for vibratory movement about point 16. As described in my aforesaid patents, the sensing element 12 is adapted to be vibrated and adapted to contact the material to be measured whereby a change in the vibration of the element 12 is an indication of the valve or change in valve of a physical property of the material being measured.

Vibration drive means 18 are provided for vibrating the sensing element 12 such as an electromagnetic coil which attracts and releases an armature 20 connected to the sensing element 12 in response to an electrical source connected to the electrical leads 22 and 24. Thus, when an electrical source such as an alternating current voltage or a pulsating DC voltage is applied to the coil 18 the armature 20 is attracted and released thereby causing the sensing element 12 to vibrate at the frequency of the applied electrical source.

Suitable measuring means 26 are provided for measuring the vibration of the sensing element 12 such as an electromagnetic coil in which an armature 28, which is connected to the sensing element 12, vibrates in response to vibration of the sensing element 12 to create a voltage in the output leads 30 and 32 which is a measure of the amplitude of vibration of the sensing element 12 and is indicative of the value or change in value of the physical property being measured of the material contacting the sensing element 12. That is, changes in the physical properties of the material such as its density, mass, specific gravity, viscosity, interface and material level affect the vibration of the sensing element 12 and the output from coil 26 may be used as an indication of the value or change in the value of property being measured.

The above-named operation and structure is generally shown in my aforementioned patents. The present invention is directed to resiliently mounting the vibration drive means 18 and the vibration measuring means 26 on the sensing element 12 so that drive means 18 and measuring means 26 float or move with the element 12 and thus are substantially isolated from external environmental conditions. Thus, a support 34 is provided from which the vibration drive means 18 and the vibration measuring means 26 are connected and the support 34 is in turn resiliently supported from the sensing element 12 by suitable resilient means such as one or more springs 36 which are in turn connected to the sensing element 12 either directly or through connecting rods 38. Thus, the support 34, the vibration drive means 18, and the vibration measuring means 26 vibrate relative to the material sensing element 12 through the resilient springs 36, but yet are mounted on the member 12 and float with the member 12 and thus are not affected by other vibration frequencies through which the sensing element support 14 is affected.

The islation of the input signal to drive means 18 and the output signal from measuring means 26 from the support 14 may best be seen by referring to the vibration frequencies of the system. Generally, the natural resonant frequency of a system, $$F_R = \frac{\sqrt{29.4EI}}{Wl^3}$$

where

E = the modulus of elasticity,
I = the moment of inertia about the bending point,
W = the effective weight,
l = the distance of the effective weight from the point of bending.

Thus for the entire apparatus 10 which vibrates about the support point 16 the natural resonant frequency $$F_{RT} = \frac{\sqrt{29.4E_1I_1}}{W_Tl_1^3}$$

where $W_T$ is the total effective weight of apparatus 10 and the other properties are indicated in FIGURE 1.

Therefore, the natural resonant frequency of the sensing element 12 which vibrates about spring connections 37, $$F_{R3} = \frac{\sqrt{29.4E_2I_2 \cdot 4}}{W_3l_2^3} \text{ (number of springs)}$$

where $E_2$ = the modulus of elasticity of a spring 36,
$I_2$ = the moment of inertia of a spring 36,
$W_3$ = equivalent weight of the sensing element 12, and
$l_2$ = length of a spring 36.

Also to be considered is the natural resonant frequency of the support 34 and components connected thereto, the vibration drive means 18 and of the vibration measuring means 26, all of which also tend to vibrate about the springs but at the ends 39 and has a natural resonant frequency, $E_{R2}$, equal to $$\frac{\sqrt{29.4E_2I_2 4}}{W_2l_2^3} \text{ (number of springs)}$$

where $W_2$ = equivalent weight of the support 34 and its connected components.

Preferably, the weight $W_2$ will be greater than the weight of $W_3$ and then the floating system $W_2$ will remain relatively motionless due to its inertia and $W_3$ will vibrate relative to $W_2$. Thus, by way of example only in one typical installation, the natural resonant frequency of the complete system $F_{RT}$ is 5 cycles per second, the natural resonant frequency the sensing element $F_{R3}$ is 100 cycles per second, and the natural resonant frequency of the support and its components, $F_{R2}$ is 70 cycles per second. Assuming such typical figures there will be virtually no vibration between $W_2$ and $W_3$ at 5 cycles per second as both the element 12 and the drive means 18 and the measuring means 26 move together and there will be no relative motion at the 5 cycles per second signal. Therefore, preferably the operational frequency of the voltage source applied to the vibration drive means 18 should approximate the natural resonant frequency of $W_3$, in the example given 100 c.p.s., for greatest sensitivity whereby changes in the material on the sensing element 12 will affect the mass of the sensing element 12 and $W_3$ thereby changing its amplitude of vibration for providing a measurement in the output 30 and 32 of the vibration measuring means 26.

Thus, transmissibility of the vibration signals from the support 14 to the input and output signals is small. That is, transmissibility equals $$\frac{l}{l - \left(\frac{f_{op}}{F_{RT}}\right)^2}$$

where $f_{op}$ is the frequency of operation.

Assuming the figures give above, transmissibility from support 14 equals $$\frac{l}{l - \left(\frac{100}{5}\right)^2} = .0025$$

Because of this low transmissibility, .0025, from the support 14, the apparatus 10 from a practical standpoint will not be affected by external vibrations at the support 14 even if the external vibrations are at the operational frequency of 100 cycles per second or at the natural resonant frequencies of $W_2$ or $W_3$.

Figure 2:
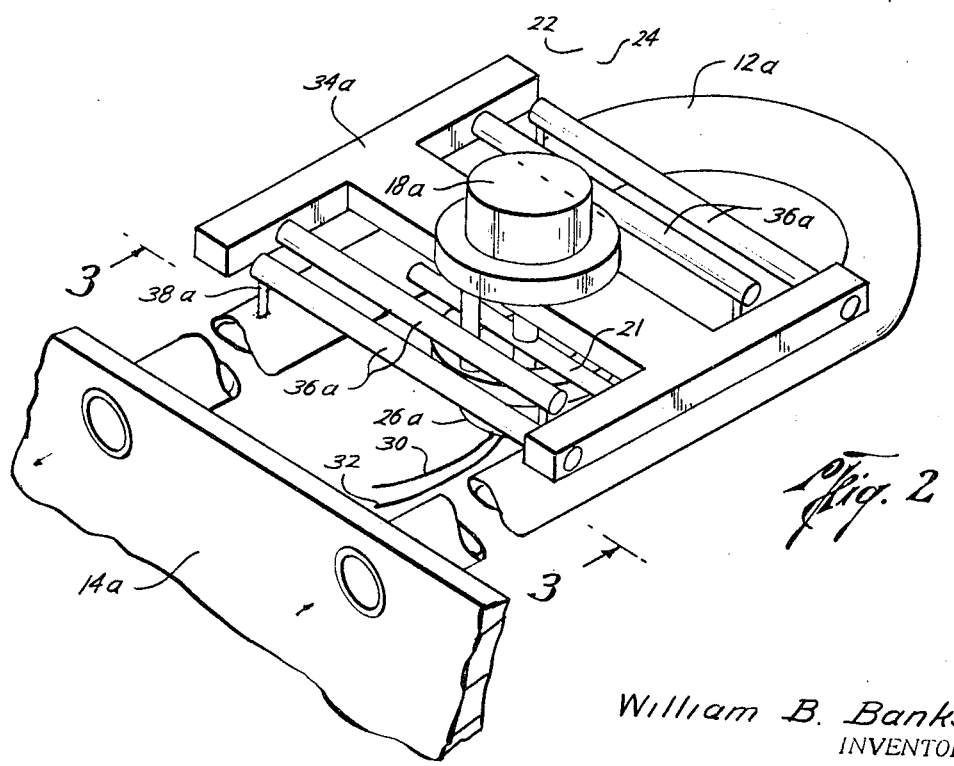
FIGURE 2 is a perspective view of one form of the present invention.

Of course, various embodiments of this apparatus can be provided in which the vibration drive means and the vibration measuring means are resiliently connected to the material sensing element for measuring values and changes in the physical properties of material acting on the material sensing element 12. FIGURES 2, 3 and 4 illustrate modifications of the present invention, the letters a and b, being applied to the parts generally corresponding to those in FIGURE 1 for convenience of reference.

Referring now to FIGURES 2 and 3, one embodiment is shown in which the material sensing element 12a is in the form of a hollow U tube in which the material to be measured may be held in the interior of the member 12a or flow therein while being measured. Frame 34a is provided on which is supported the vibration drive means 18a and the vibration measuring means 26a, and which in turn is supported by one or more springs 36a one end of which is connected to the frame 34a and the other end of which is secured to the U tube 12a such as by rods 38a. Thus, when an applied electrical source is applied to the leads 22a and 24a to the vibration drive means 18a, the armature 20a which is connected to the U tube sensing element 12a through a connecting member 21 vibrates at the applied frequency. Changes in the mass of the fluid in or flowing through the U tube 12a will change the amplitude of vibration of the tube 12a and of its connected armature 28a which is then indicated in the output signal from electrical lines 30a and 32a from the vibration measuring means 26a. In this particular embodiment it is to be noted that the springs 36a which primarily determine the natural resonant frequency of $W_3$ and thus of the output response are external of the U tube 12a and thus not in contact with the material in the tube 12a and this particular embodiment therefore is particularly useful for handling hot process streams having high temperatures, such as 1000° F. That is, while the U tube 12a would tend to change its modulus of elasticity with temperature and thus its natural resonant frequency, the springs 36 are not substantially affected by temperature changes. Similarly, while the U tube 12a may change its dimensions with temperature, the springs 36a, the drive means 18a and measuring means 26a, since they are external to the material being measured are not subjected to the temperature changes and are less subject to temperature distortion; therefore, the input and output signals are isolated from such temperature changes to a substantial extent.

Any suitable output measurement may be measured from the vibration measuring coil 26a. That is, the apparatus 10a may be supplied with a constant frequency to vibration drive means 18a and the output voltage from the coil 28a will be a measure of the mass of the driven member 12a which includes the effect of the material thereon. Or as disclosed in Patent No. 3,349,604, entitled "Apparatus for Determining Physical Properties of Materials," the apparatus 10a may be driven at resonant frequency, and the change in frequency is a measure of the mass of the driven member which includes the effect of the material contacting the material sensing element 12a.

Referring now to FIGURE 4, another embodiment is shown in which the material sensing element 12b is in the form of an elongate hollow tube which is adapted to be secured to a support 14b which may be a material container, a pipeline or a bin in which a physical property of the material therein is to be measured and which is adapted to be vibrated about support connection 16b. Interiorly of the sensing element 12b, and sealingly separated from the material is suitable vibration drive means 18b such as an electromagnetic coil which attracts and releases drive armature 20b which is connected to the sensing element 12b and a vibration measuring means 26b such as an electromagnetic coil which measures the amplitude of vibration of the armature 28b. The coils 18b and 26b and their supporting frame 34b are suitably supported in turn by a spring 36b from the sensing element 12b. Preferably, the mass of the frame 34b and the coils 18b and 26b is greater than the mass of sensing element 12b, therefore the frame 34a will, because of its greater inertia, tend to remain stationary when an input signal is applied to the input lines 22b and 24b and sensing element will be attracted and released to cause it to vibrate at the applied frequency applied to the electromagnetic drive coil 18b. Thus as in the other embodiments, there will be relative motion between the sensing element 12b and the drive and pickup means 18b and 26b respectively, but any vibration of the support 14b will not substantially affect the input and output signal since the frame 34b floats on and moves with the sensing member 12b. And because of the higher operating frequency and the higher natural resonant frequency of the spring 36b as compared with the lower natural resonant frequency of the apparatus 10b about the point of support 16, the stability of apparatus 10b will be not be substantially affected by external vibrations. The apparatus 10b may be used to measure physical properties such as mass, material interface, viscosity, density and specific gravity.

What is claimed is:

1. An apparatus for measuring physical properties of materials comprising:
    a material sensing element,
    means for supporting said element for flexural movement,
    vibration drive means including first and second members, the first of which is connected to the sensing element for vibrating said sensing element,
    measuring means including first and second members, the first of which is connected to the sensing element for measuring the vibration of said sensing element,
    spring means supporting said vibration drive means second member and said measuring means second member from the sensing element at a point spaced from the sensing element support means.

2. The apparatus of claim 1 wherein the spring means has a higher natural resonant frequency than the natural resonant frequency of the apparatus about the element support means.

3. An apparatus for measuring physical properties of materials comprising:
    a material sensing element adapted to contact the material,
    means for supporting said element for flexural movement,
    vibration drive means including first and second members, the first of which is connected to said sensing element for vibrating said sensing element,
    vibration measuring means including first and second members, the first of which is connected to said sensing element for measuring the vibration of said sensing element,
    spring means for supporting the vibration drive means second member and the vibration measuring means second member from the sensing element,
    the natural resonant frequency of the apparatus about the sensing element support means being substantially lower than the frequency of the vibration drive means.

4. An apparatus for measuring physical properties of materials comprising:
    a material sensing element,
    means for supporting said element for vibratory movement,
    vibration drive means including first and second members, the first of which is connected to the sensing element for vibrating said sensing element,
    measuring means including first and second members, the first of which is connected to said sensing element for measuring the vibration of said sensing element,
    said vibration drive means second member and said vibration measuring means second member being resiliently supported from the sensing element at a position spaced from the support means, and
    the mass of said vibration drive means and said vibration measuring means being greater than the mass of the sensing element.

5. The apparatus of claim 4 wherein the sensing element is a U-tube conducting the material being measured.

6. The apparatus of claim 4 wherein the sensing element is an elongate rod.

7. The apparatus of claim 4 wherein the material sensing element is hollow and the vibration drive means and the vibration measuring means is supported from the element on the side remote from the side adapted to contact the material.

8. The apparatus of claim 4 wherein the vibratory signal transmissibility of the sensing element is small whereby the apparatus will not be affected by external conditions.

9. An apparatus for measuring physical properties of materials comprising:
    a material sensing element for contacting the material,
    means for supporting said element for vibratory movement, vibration drive means including first and second members, the first of which is connected to said sensing element for vibrating said sensing element, measuring means including first and second members, the first of which is connected to the sensing element for measuring the vibration of said sensing element, spring means for supporting said vibration drive means second membtr and said vibration measuring means second member from the sensing element at a position spaced from the sensing element support means.

the mass of the vibration drive means and the vibration measuring means being greater than the mass of the sensing element, and the natural resonant frequency of the apparatus about the sensing element support means being substantially lower than the frequency of the vibration drive means.

10. The apparatus of claim 9 wherein the spring means has a higher natural resonant frequency than the natural resonant frequency of the apparatus about the sensing element support means.

11. An apparatus for measuring the mass of a flowing material comprising:

a hollow U-tube sensing element for conducting said material, means for supporting said element for vibratory movement about its legs, electromagnetic vibration drive means for transversely vibrating said element and positioned outside said tube and spaced from the tube support means, electromagnetic vibration measuring means for measuring the vibration of said tube element positioned outside said tube and spaced from the tube support means, spring means supporting said vibration drive means and said measuring means from said tube element, and the spring means having a higher natural resonant frequency than the natural resonant frequency of the apparatus about the element support means.

12. The apparatus of claim 11 wherein the mass of the transverse drive means and the vibration measuring means is greater than the mass of the sensing element.

13. An apparatus for measuring the physical properties of materials comprising:

a hollow elongate sensing element having first and second ends, means for supporting the element for vibratory movement about the first end and the second end is adapted to contact the material to be measured, electromagnetic transverse vibration means positioned inside said element for vibrating said sensing element and spaced from said one end, electromagnetic vibration measuring means for measuring the vibration of said element and positioned inside said tube and spaced from said first end, spring means supporting said vibration means and said measuring means from the elongate sensing element, the mass of the sensing element being less than the mass supported from the element by the spring means.

14. The apparatus of claim 13 wherein the spring means has a higher natural resonant frequency than the natural resonant frequency of the apparatus about the element support means.

References Cited

UNITED STATES PATENTS

| | | | |
|---|---|---|---|
| 3,039,296 | 6/1962 | Destuynder et al. | 73—67.2 |
| 3,145,559 | 8/1964 | Banks | 73—32 |
| 3,177,705 | 4/1965 | Banks | 73—54 |

RICHARD C. QUEISSER, *Primary Examiner.*

J. P. BEAUCHAMP, *Assistant Examiner.*

U.S. Cl. X.R.

73—54, 67.1